United States Patent
Massonnat (10) Patent No.: US 10,422,911 B2
(45) Date of Patent: Sep. 24, 2019

(54) METHOD AND DEVICE FOR PROCESSING WELL DATA

(71) Applicant: TOTAL SA, Courbevoie (FR)

(72) Inventor: Gérard Massonnat, Idron (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 15/531,658

(22) PCT Filed: Nov. 28, 2014

(86) PCT No.: PCT/FR2014/053086
§ 371 (c)(1),
(2) Date: May 30, 2017

(87) PCT Pub. No.: WO2016/083676
PCT Pub. Date: Jun. 2, 2016

(65) Prior Publication Data
US 2017/0329030 A1    Nov. 16, 2017

(51) Int. Cl.
*G01V 1/40*    (2006.01)
*G01V 1/48*    (2006.01)
*G01V 1/46*    (2006.01)

(52) U.S. Cl.
CPC .......... *G01V 1/48* (2013.01); *G01V 1/40* (2013.01); *G01V 1/46* (2013.01); *G01V 2210/624* (2013.01)

(58) Field of Classification Search
CPC ... G01V 1/40; G01V 1/46; G01V 1/48; G01V 2210/624
See application file for complete search history.

(56) References Cited

U.S. PATENT DOCUMENTS

| 2006/0041409 A1* | 2/2006 | Strebelle ............... G01V 1/30 703/10 |
| 2010/0332205 A1 | 12/2010 | Tillier et al. |
| 2015/0212234 A1 | 7/2015 | Massonnat |

FOREIGN PATENT DOCUMENTS

| EP | 2270548 A1 | 1/2011 |
| FR | 1257648 A | 4/1961 |

(Continued)

OTHER PUBLICATIONS

International Search Report PCT/FR2014/053086, dated Aug. 21, 2015, 5 pages.

(Continued)

*Primary Examiner* — Ian J Lobo
(74) *Attorney, Agent, or Firm* — Patterson Thuente Pedersen, P.A.

(57) ABSTRACT

The present invention concerns a method for processing well data from a well. The method comprises: receiving, for each current facies, a presence probability distribution of said current facies, depending on a parameter influencing sedimentation. For each current measurement, and in a space comprising at least a first axis and a second axis, determining at least one point having, as a coordinate along the first axis, said current measurement, and as a coordinate along the second axis, a value of the parameter, determined depending on the presence probability distribution of the facies associated with the current measurement in the received well data. The method further comprises determining a curve in the space depending on at least one point for each measurement of the plurality of measurements.

10 Claims, 6 Drawing Sheets

(56) References Cited

FOREIGN PATENT DOCUMENTS

FR 2926379 A1 * 7/2009 ............. G01V 11/00
FR 2994314 A1 2/2014

OTHER PUBLICATIONS

English translation of International Search Report PCT/FR2014/053086, dated Aug. 21, 2015, 3 pages.
J. L. Baldwin: "Using a Simulated Bidirectional Associative Neural Network Memory With Incomplete Prototype Memories to Identify Facies From Intermittent Logging Data Acquired in a Siliciclastic Depositional Sequence: A Case Study", SPE Annual Technical Conference and Exhibition 1991, Oct. 9, 1991 (Oct. 9, 1991), pp. 273-286, XP055198576, DOI: 10.2118/22843-MS.
Lerat O et al: "Construction of stochastic geological model constrained by high-resoluton 3D seismic data—Application to the Girassol field, offshore Angola", SPE Annual Technical Conference and Exhibition, XX, XX, vol. 4, No. 110422, Nov. 11, 2007 (Nov. 11, 2007), pp. 2789-2804, XP002500514, DOI: 10.2118/110422-MS.

\* cited by examiner

METHOD AND DEVICE FOR PROCESSING WELL DATA

RELATED APPLICATIONS

The present application is a National Phase entry of PCT Application No. PCT/FR2014/053086, filed Nov. 28, 2014, said application being hereby incorporated by reference herein in its entirety.

FIELD OF THE INVENTION

The present invention concerns the field of the processing of well data in particular for enabling the simplified comparison of well data and/or for completing the well data, some parts of which are missing or unknown.

BACKGROUND OF THE INVENTION

During drilling, it is possible to determine well data in particular from cores taken for said well. Said well data may be represented by a vertical stacking of strata representative of facies.

Nevertheless, said data being discrete data, it may be complicated to compare same.

In addition, during the restoration of well data (e.g. re-establishment of a geologic time of sedimentation in the well data as, for example, described in patent application FR1257648), some parts of the well data may be unknown (in particular due to the presence of faults, due to the occurrence of erosions, etc.).

The completion of said unknown zones may be difficult by geologists without assistance.

Thus, there is a need to simplify the comparison of well data and help the geologists in order to complete the unknown parts of the well data.

The present invention improves the situation. To this effect, the present invention proposes a method for processing well data contributing to the resolution of said objectives.

SUMMARY OF THE INVENTION

The aim of the present invention is a method for processing well data from a well in a geological subsurface, the well data comprising, for each current spot height from a plurality of spot heights, an association between said current spot height and a facies from a plurality of facies.

The method comprises:
receiving well data;
receiving, for each current facies of the plurality of facies, a presence probability distribution of said current facies, depending on a parameter influencing sedimentation;
for each current spot height of the plurality of spot heights, and in a space comprising at least one first axis and a second axis:
determining at least one point in said space, said at least one point having as a coordinate along the first axis said current spot height and as a coordinate along the second axis a coordinate depending on the presence probability distribution of the facies associated with said current spot height in said received well data;
determining a curve in said space depending on said at least one point for each spot height of the plurality of spot heights.

For example, the coordinate along the second axis may be a coordinate for which the probability distribution is non-zero.

In one embodiment, the parameter influencing sedimentation may be a parameter in a group comprising a distance to the well, a sedimentation energy, a water depth during sedimentation.

The sedimentation energy may, for example, be related to the speed of the water of a river, a level of turbulence, etc.

Said parameter may also be related to the chemical composition of the sedimentation environment (e.g. the concentration of salts may influence sedimentation in certain rocks/facies).

Furthermore, the at least one determined point may be associated with a weight, said weight depending on the presence probability distribution of the facies associated with said current spot height in said received well data. The determination of said curve may therefore depend on said at least one weight associated with said at least one point.

Advantageously, the determination of said curve may comprise polynomial regression or linear regression or multiple linear regression or a Savitzky-Golay method.

In one particular embodiment of the invention, the determination of said curve may comprise minimising a distance, said minimised distance comprising an operation in a group comprising:
a sum of distances between the determined curve and the at least one determined point;
a sum of squares of distances between the determined curve and the at least one determined point;
a sum of distances to the power N between the determined curved and the at least one determined point, N being an integer greater than or equal to 3;

Furthermore, the determination of said curve may comprise minimising a distance, said minimised distance comprising an operation in a group comprising:
a weighted sum of distances between the determined curve and the at least one determined point, the weighting depending on the weights associated with the determined points.
a weighted sum of squares of distances between the determined curve and the at least one determined point, the weighting depending on the weights associated with the determined points.
a weighted sum of distances to the power N between the determined curve and the at least one determined point, N being an integer greater than or equal to 3, the weighting depending on the weights associated with the determined points.

Advantageously, the method may further comprise:
for at least one current spot height, normalising the weights of the points having as a coordinate along the first axis said current spot height.

In one particular embodiment of the invention, the method may further comprise:
determining a facies associated with a given spot height, said determination depending on the value of the determined curve for said given spot height, and the received probability distributions.

Thus, the aim of the present invention is also a device for processing well data from a well in a geological subsurface, the well data comprising, for each current spot height from a plurality of spot heights, an association between said current spot height and a facies from a plurality of facies. The device comprises:
an interface for receiving well data;

an interface for receiving, for each current facies of the plurality of facies, a presence probability distribution of said current facies, depending on a parameter influencing sedimentation;

for each current spot height of the plurality of spot heights, and in a space comprising at least one first axis and a second axis:

a circuit for determining at least one point in said space, said at least one point having as a coordinate along the first axis said current spot height and as a coordinate along the second axis a coordinate depending on the presence probability distribution of the facies associated with said current spot height in said received well data;

a circuit for determining a curve in said space depending on said at least one point for each spot height of the plurality of spot heights.

A computer program, implementing all or part of the above-described method, installed on pre-existing equipment, is per se advantageous, from the moment it makes the processing of well data possible.

Thus, the aim of the present invention is also a computer program comprising instructions for implementing the previously described method, when said program is run by a processor.

Said program may use any programming language (for example, an object language or other), and be in the form of an interpretable source code, a partially compiled code or a fully compiled code.

Figure 4:
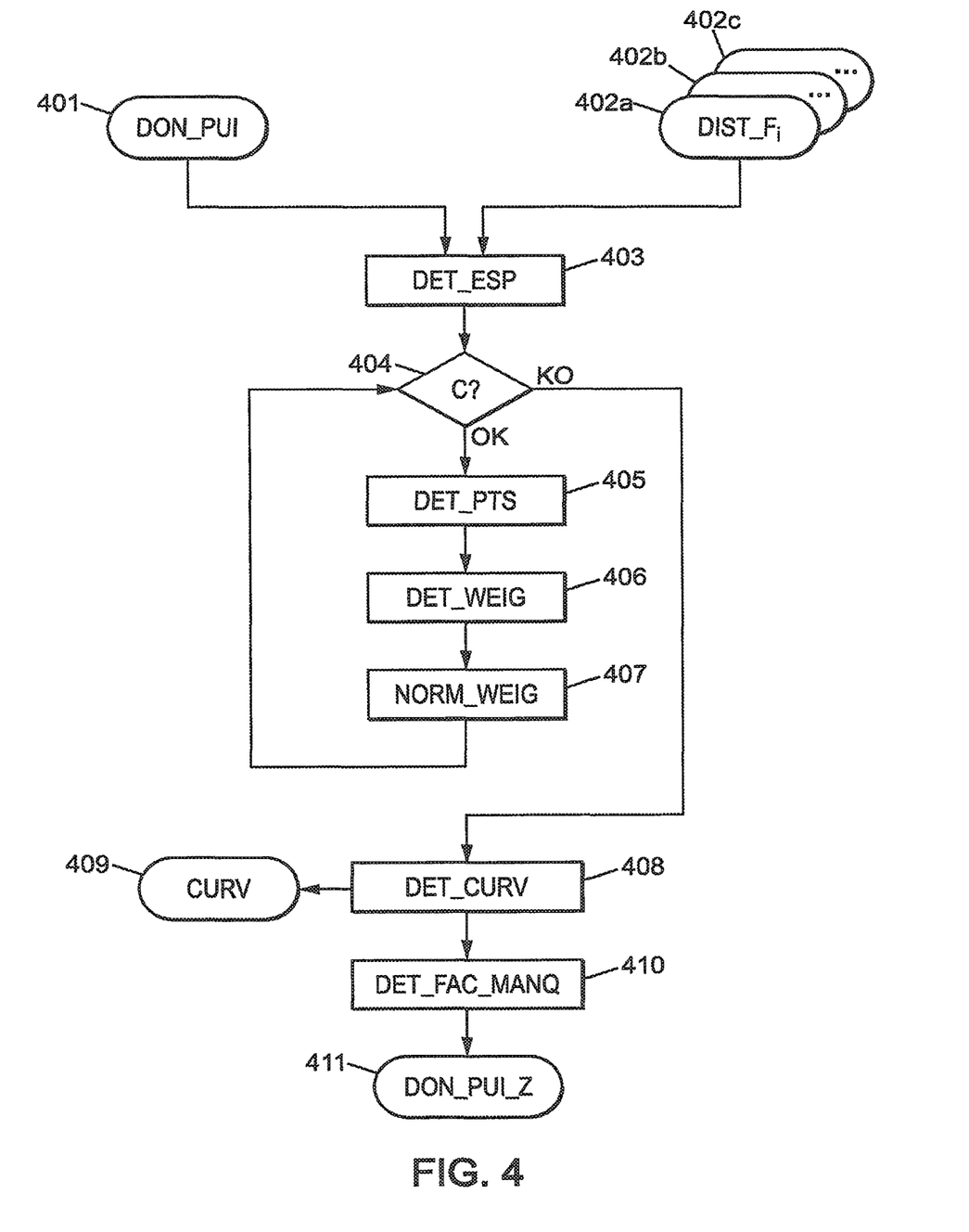
FIG. 4 illustrates a flow chart of one embodiment of the invention.

FIG. 4 described in detail hereafter, may form the flow chart of the general algorithm of one such computer program.

Other features and advantages of the invention will again appear upon reading the following description. Said description is purely illustrative and must be read with regard to the appended drawings wherein:

DETAILED DESCRIPTION OF THE DRAWINGS

Figure 1:
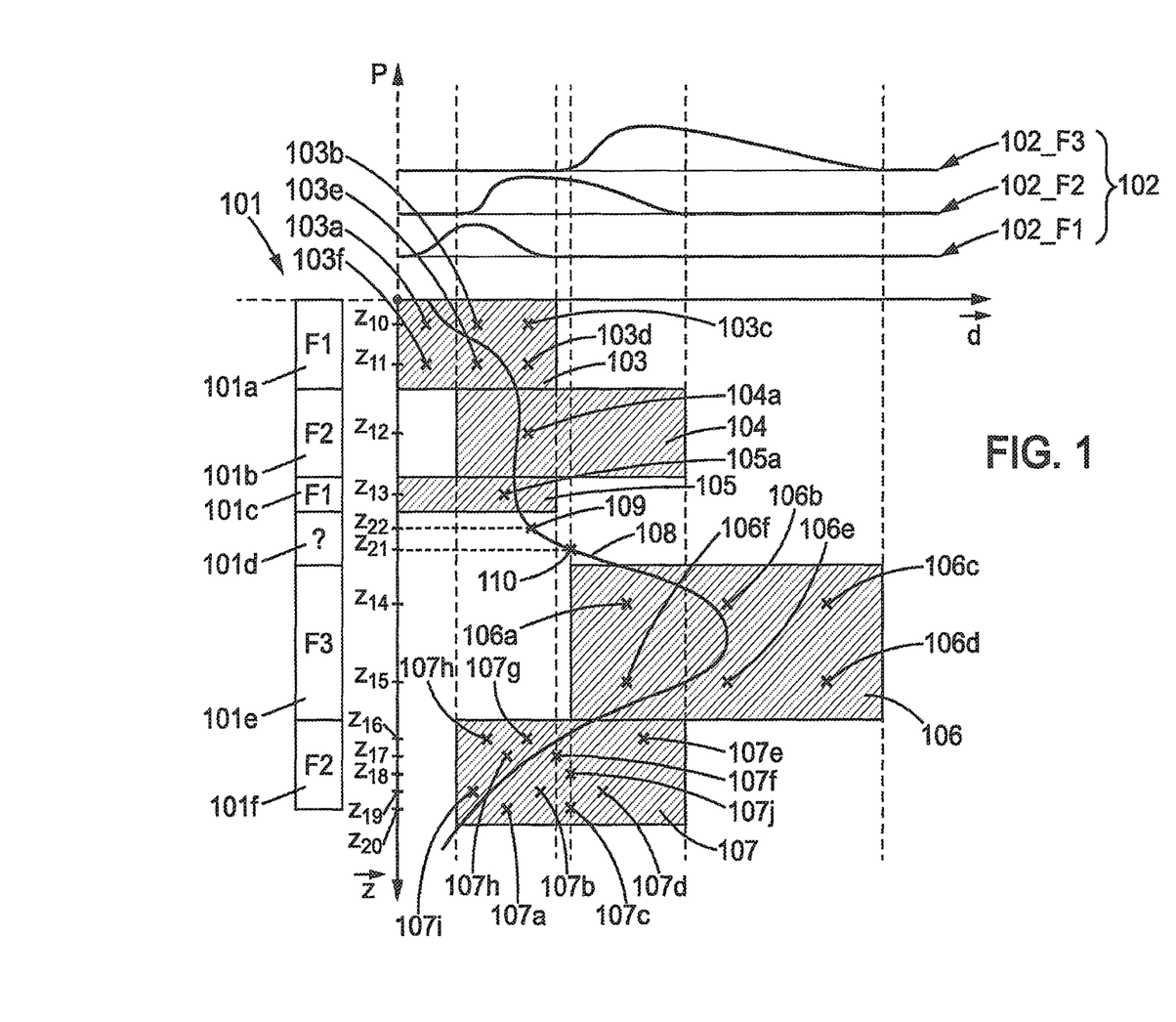
FIG. 1 illustrates an illustration of one particular embodiment of the invention.

FIG. 1 illustrates an illustration of one particular embodiment of the invention.

For implementing the invention, it is useful to have received well data from a wellbore of a geological subsurface, for example. Said well data 101 may be shown in the form of a succession of facies (e.g. facies no. 1 or F1 for the block 101a, facies no. 2 or F2 for the block 101b, F1 for the block 101c, an unknown facies for the block 101d, facies no. 3 or F3 for the block 101e, F2 for the block 101f) distributed along a vertical axis $\vec{z}$. Said succession of facies represents the various sedimentation strata in the geological subsurface considered.

It is also useful to receive information concerning the probability distributions 102 for at least one part of the facies present in the well data. By way of illustration, the probability distribution 102_F1 represents the probability distribution of the facies F1, the probability distribution 102_F2 represents the probability distribution of the facies F2, and the probability distribution 102_F3 represents the probability distribution of the facies F3. Said probability distributions represent the presence probability of a given facies depending on a parameter influencing/controlling sedimentation of said facies. Said parameter controlling sedimentation may be:

a sedimentation distance of a facies in relation to a distance (for example, in relation to the distance to the well or to the distance in relation to a characteristic point of the geological subsurface, such as a river mouth);

a sedimentation energy of a facies (e.g. related to the turbulences of a liquid, a speed of an old river, etc.);

a water depth influencing sedimentation of a facies;

a concentration of salt or of another chemical/mineralogical/ionic product;

etc.

In FIG. 1, the horizontal axis $\vec{d}$ represents said parameter controlling sedimentation.

After receiving the well data 101 and the distributions associated with each facies 102, it is possible to create a space defined by the two axes $\vec{d}$ and $\vec{z}$. Said space is useful for creating the curve according to said embodiment of the invention, as indicated below.

For a spot height $z_i$ of the axis $\vec{z}$ (with i an integer in the interval [10-20] in the example in FIG. 1), it is possible to follow the following process:

identify the facies $F_j$ corresponding to said spot height $z_i$ (with j an integer in the interval [1-3] in the example in FIG. 1): for example, the spot height $z_{10}$, $z_{11}$, $z_{13}$ corresponds to the facies F1, the spot height $z_{12}$, $z_{16}$, $z_{17}$, $z_{18}$, $z_{19}$, $z_{20}$ corresponds to the facies F2, the spot height $z_{14}$, $z_{15}$ corresponds to the facies F3.

identify the probability distribution $102\_F_j$ corresponding to the facies $F_j$: for example, the probability distribution 102_F1 corresponds to the facies F1, the probability distribution 102_F2 corresponds to the facies F2, the probability distribution 102_F3 corresponds to the facies F3, Once the facies $F_j$ and the distribution $102\_F_j$ have been identified, it is possible to show a zone $Z_{ij}$ in the previously defined space, said zone corresponding to all points of the space having a spot height along the axis $\vec{z}$ corresponding to the facies $F_j$ and having a coordinate along the axis $\vec{d}$ corresponding to a non-zero probability of the distribution $102\_F_j$. By way of illustration:

the zone 103 or 105 corresponds to a zone corresponding to the facies F1 for which the probability distribution 102_F1 is non-zero;

the zone 104 and 107 corresponds to a zone corresponding to the facies F2 for which the probability distribution 102_F2 is non-zero;

the zone 106 corresponds to a zone corresponding to the facies F3 for which the probability distribution 102_F3 is non-zero;

The determination of said zones is not essential to the invention but makes it possible to graphically display the zones wherein points may be determined according to one of the embodiments of the invention.

Indeed, once the facies $F_j$ and the distribution $102\_F_j$ have been identified, it is possible to determine for the spot height $z_i$, one or more points using the distribution. By way of illustration, it is possible to determine said points as follows, in an alternative manner or cumulative manner:

determination of a point having as a coordinate along the axis $\vec{d}$ the coordinate corresponding to the highest probability of the distribution $102\_F_j$ (for example, the point 104a corresponding to the maximum of the distribution $102\_F2$);

determination of a point having as a coordinate along the axis $\vec{d}$ the coordinate corresponding to a random selection for a random variable corresponding to the distribution $102\_F_j$ (for example, the coordinate of the point 105a has been selected randomly in the distribution $102\_F1$);

determination of a plurality of points having as a coordinate along the axis $\vec{d}$ the coordinate corresponding to a random selection for a random variable corresponding to the distribution $102\_F_j$ (for example, the points 107a to 107j correspond to said determination with the distribution $102\_F2$). If a large number of points are determined, the concentration of points along the axis $\vec{d}$ follows the law of probability of said distribution $102\_F_j$;

determination of a predetermined number of points evenly distributed in the interval of coordinates along the axis $\vec{d}$ corresponding to a non-zero distribution $102\_F_j$ (for example, three points 103a, 103b, 103c respectively 103f, 103e, 103d are determined for the spot height $z_{10}$ respectively $z_{11}$, the distance between said points being a quarter of the length of the zone 103; in another example, three points 106a, 106b, 106c respectively 106f, 106e, 106d are determined for the spot height $z_{14}$ respectively $z_{15}$, the distance between said points being a quarter of the length of the zone 106).

Once all of said points have been defined, it is possible to determine a curve 108 passing substantially through said points. The determination of the curve may be achieved using polynomial regression/approximation, linear regression/approximation, multiple linear regression/approximation or even a Savitzky-Golay method. Said determination may also be achieved using a combination of said methods.

Once the curve 108 has been determined, it is possible to complete the well data if same are incomplete: for example, in the well data 101, the block 101d is not associated with a given facies because said facies is unknown.

In order to determine the facies corresponding to a spot height not associated to a given facies (for example, the spot height $z_{21}$ and/or the spot height $z_{22}$), it is possible to follow the following process:

determine the coordinate along the axis $\vec{d}$ of one point of the curve having said spot height as a coordinate along the axis $\vec{z}$ (point 109 for the spot height $z_{22}$ and point 110 for the spot height $z_{21}$);

apply one of the following methods of determination for the facies:

determine the facies corresponding to the distribution having the highest probability for the coordinate determined during the previous step (the facies F2 for the points 109 and 110);

perform a random selection from the possible facies, the probability of the selection of a given facies corresponding to the value of the distribution of said facies and for the coordinate determined during the previous step;

associate the determined facies with said spot height.

Of course, said process may result in the fact that the variability of the recently associated facies is very high in the spot heights initially not associated with a facies (in particular in the case of random selection). Thus, optionally, it is possible to re-associate with a plurality of successive spot heights the same facies, said facies being the most frequent in a given interval of spot heights: for example if in the interval [z30-z40], 7 spot heights have been associated with the facies F1 and that 4 spot heights have been associated with the facies F2, it is possible to re-associate with the spot heights $z_{30}$ to $z_{40}$ the facies F1 as being the most common in said interval. The width of the interval considered may be determined arbitrarily (for example by an operator having knowledge of the variability of the facies in said zone) or depending on the width of the blocks in the well data (e.g. mean of the width of all of the blocks in the well data, mean of the width of blocks in the well data and located within a predetermined distance of the block not associated with a given facies for which the determination is made). For said determination of the width of the interval, the neighbouring blocks of blocks not associated with a facies may be ignored: indeed, the width thereof is questionable, the non-associated block being able to hide the true terminals thereof.

It is also possible, in order to determine the facies to associate with the block 101d, to presume, successively, that the block 101d is associated with a given facies, to calculate the curve 108 as previously explained: once each curve has been calculated, it is possible to compare same with the curve initially calculated without taking into account the block 101d and to select for the block 101d the facies for which the associated curve is the most similar to the initial curve.

Figure 2:
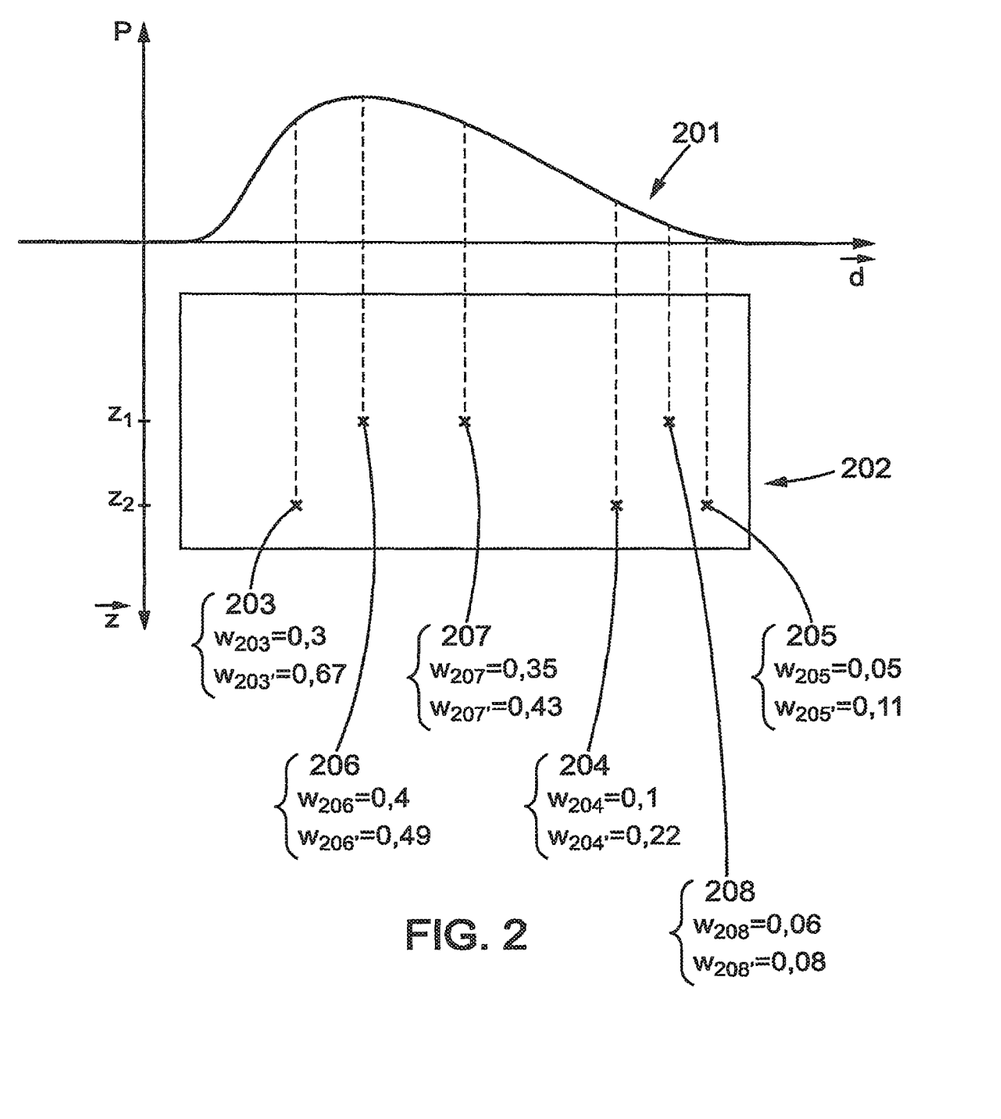
FIG. 2 illustrates a point weighting depending on the distribution of the facies considered in one embodiment according to the invention.

FIG. 2 illustrates a point weighting depending on the distribution of the facies considered in one embodiment according to the invention;

Indeed, it is also possible to associate with each determined point (as previously described, for example) a weight.

The weight may depend on the probability distribution 201 of the facies associated with said current spot height ($z_2$ or $z_2$). Thus, the determination of the curve 108 may also depend on the weight associated with said points.

For example, for the spot height $z_1$, the three points 206, 207, 208 may be associated respectively with the weights $w_{206}=0.4$, $w_{207}=0.35$, $w_{208}=0.06$ corresponding to the value of the distribution 201 for the coordinate along the axis $\vec{d}$ corresponding to the points.

In addition, for the spot height $z_2$, the three points 203, 204, 205 may be associated respectively with the weights $w_{203}=0.3$, $w_{204}=0.1$, $w_{205}=0.05$ corresponding to the value of the distribution 201 for the coordinate along the axis $\vec{d}$ corresponding to the points.

It is possible, in order to limit or prevent any effect related to an excessive concentration of points in a particular zone of the space, to normalise the weight values.

Thus, the normalised weight values $w_{203}$, $w_{204}$, $w_{205}$ may be $w_{203}'=0.67$, $w_{204}'=0.22$, $w_{205}'=0.11$ (thus, $w_{203}'+w_{203}'+w_{205}'=1$). The normalised weight values $w_{206}$, $w_{207}$, $w_{208}$ may be $w_{206}'=0.49$, $w_{207}'=0.43$, $w_{208}'=0.08$ (thus, $w_{206}'+w_{207}'+w_{208}'=1$).

Said weights (normalised or not) may therefore be used in the determination of the curve by giving more or less importance to certain points in relation to others, in particular by weighting the calculation of the residue during the minimisation thereof during the determination of the curve.

Figure 3:
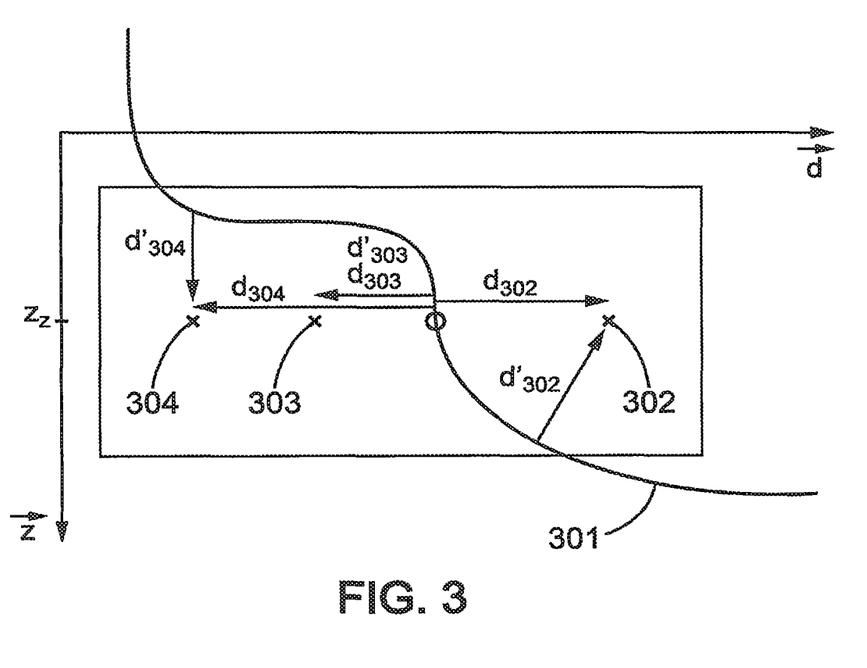
FIG. 3 illustrates a minimisation of the distance of the curve to the points determined for a given spot height in one embodiment according to the invention.

FIG. 3 illustrates a minimisation of the distance of the curve to the points determined in one embodiment according to the invention.

Indeed, during the determination of the optimum curve depending on the determined points (weighted or not), it is possible to calculate, for a given curve, a residue as being function of the sum of the distances of the curve to the various points.

The curve that may therefore be selected as being the optimum curve is the curve for which the residue is the smallest possible from all of the possible curves. Depending on the method of determination of the curve (optimum) chosen, the minimisation of the residue may be achieved analytically, iteratively (e.g. local improvement of the curve), in a stochastic manner or even by combining an iterative method and a stochastic method (e.g. method known as the "simulated annealing method").

The distance from a point to a curve may be calculated according to various methods:

distance from the point to the curve along a preferred axis (such as the axis $\vec{d}$). In the example in FIG. 3, the three points 302, 303 and 304 being used for the calculation in relation to the curve 301, the residue is therefore $d_{302}+d_{303}+d_{304}$.

the smallest distance from the point to the curve in the space $(\vec{d}, \vec{i}\,))$. In the example in FIG. 3, and under the same conditions as previously, the residue is $d_{302}'+d_{303}'+d_{304}'$.

If the points 302, 303, 304 are weighted respectively by the weights $w_{302}$, $w_{303}$ and $w_{304}$, the residue may then be $w_{302} \cdot d_{302} + w_{303} \cdot d_{303} + w_{304} \cdot d_{304}$ or $w_{302} \cdot d_{302}' + w_{303} \cdot d_{303}' + w_{304} \cdot d_{304}'$ according to the method chosen.

Furthermore, if the residue is presented as being a sum, it may be a sum of squares of distances or even, more generally a sum of distances set to the power N with N an integer greater than or equal to 2. Thus, said residue may be, for example, $d_{302}^N + d_{303}^N + d_{304}^N$ or $w_{302} \cdot d_{302}^N + w_{303} \cdot d_{303}^N + w_{304} \cdot d_{304}^N$ or $w_{302} \cdot d_{302}'^N + w_{303} \cdot d_{303}'^N + w_{304} \cdot d_{304}'^N$ FIG. 4 illustrates a flow chart of one embodiment of the invention.

On receiving the well data (401) and the facies presence probability distributions depending on a parameter controlling sedimentation for each of the facies considered (402a, 402b, 402c, etc.), it is possible to create (step 403) a space defined by at least two axes: a first axis along the axis of the well data (more often said axis is a vertical axis $\vec{z}$ or even a "vertical rendered" axis following the projection along the vertical axis of the well data) and a second axis evolving with the parameter controlling sedimentation.

It is therefore possible to identify a set of spot heights for which the following method is implemented: said set of spot heights may correspond to the discretisation of the axis $\vec{z}$ in a uniform manner (e.g. one spot height every meter, etc.) or even to a random selection of spot heights along the axis $\vec{z}$. Said set of spot heights may also be predetermined by an operator.

If a spot height has not been used for the method described below, said spot height is therefore selected (test 404, output OK).

For the selected spot height, one or more of the points of the space may therefore be determined as explained in relation to FIG. 1 (step 405). Moreover, and optionally, a weight may also be determined for each of said determined points as explained in relation to FIG. 3 (step 406). Said weights may optionally be normalised so that the sum of said weights is equal to 1 (step 407) for each of the spot heights.

If all of the spot heights have been used for the determination of points as described above (test 404, output NOK), it is possible to determine the curve as explained in relation to FIG. 1 (step 408).

Said curve may be supplied (409) to a user or another process in order to be able to use same, for example, in order to compare the well data from two different wells. Such a comparison is explained in relation to FIG. 6.

Said curve may also be used to complete (step 410) incomplete well data (i.e. certain spot heights are not associated with a facies because same is unknown) as described in relation to FIG. 1. Said incomplete data are more often related to a restoration of well data (e.g. re-establishment of a geologic time of sedimentation in the well data as, for example, described in patent application FR1257648), some parts of the well data may be unknown (in particular due to the presence of faults, erosions, etc.).

Once completed, the well data (411) may be returned for other processing operations.

Figure 6:
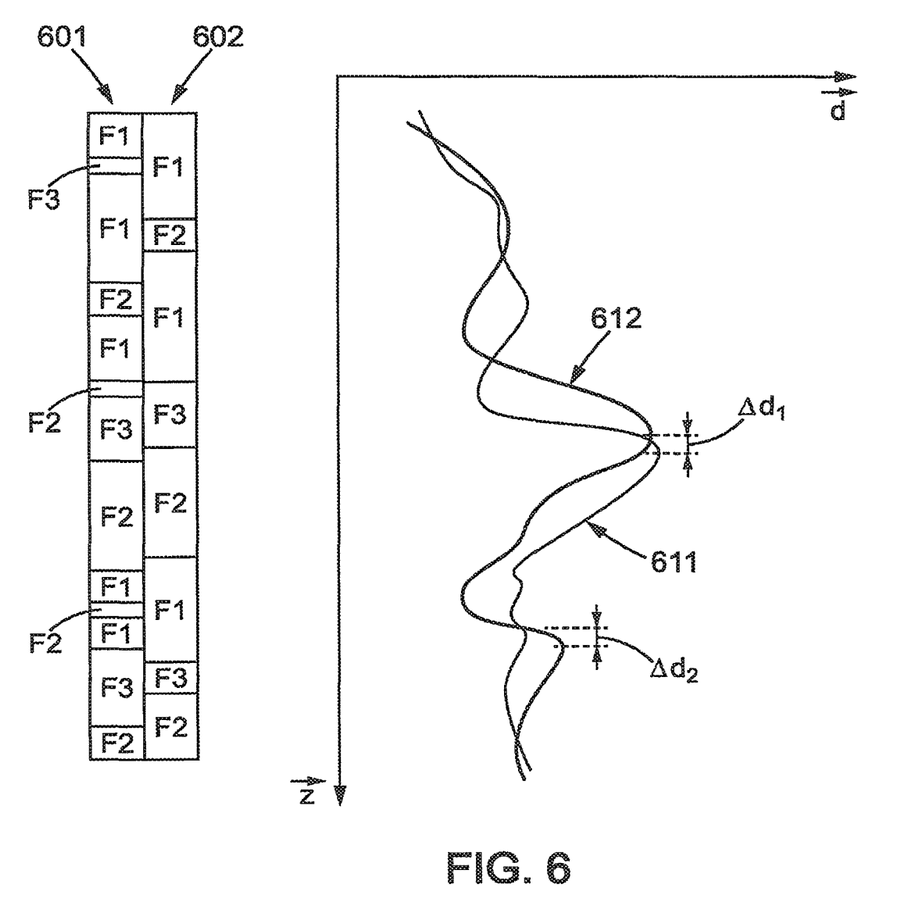
FIG. 6 illustrates the comparison of two curves determined using one embodiment of the invention.

FIG. 6 illustrates the comparison of two curves determined using one embodiment of the invention.

During the reception of two sets of well data 601 and 602, it may be complicated to compare same. Are they similar? Is there a vertical offset of the well data?

Once the curves have been determined as described in relation to FIG. 1, it is easier for a user or a computer program to compare same. By way of illustration, the curves 611 and 612 correspond respectively to the well data 601 and 602.

In the example in FIG. 6, and although the two curves 611 and 612 are different, it is possible to visually observe a vertical offset of the two curves of a value of $\Delta d_1$ or $\Delta d_2$ depending on the place where said offset on the curve is evaluated. To evaluate said offset, it is also possible to calculate the correlation or the correlation curve of said two curves in an automated manner.

Figure 5:
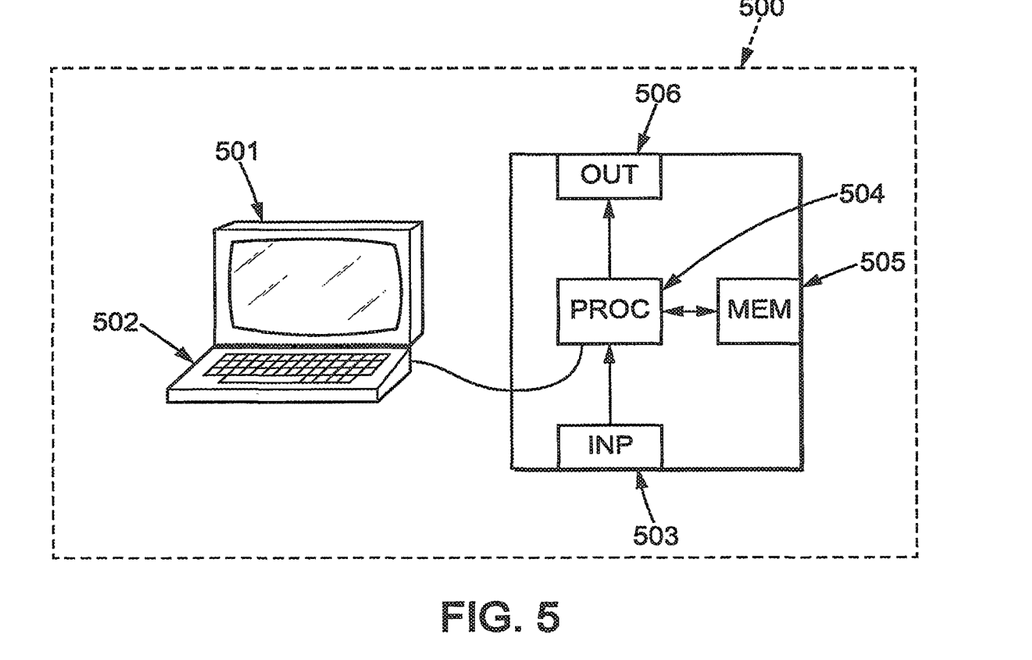
FIG. 5 shows an example of a device for processing well data in one embodiment of the invention.

FIG. 5 shows an example of a device for processing well data in one embodiment of the invention.

In said embodiment, the device comprises a computer 500, including a memory 505 for storing instructions for implementing the method, the received spot height data, and the temporary data for carrying out the various steps of the method such as described previously.

The computer further comprises a circuit 504. Said circuit may be, for example:

a processor suitable for interpreting instructions in the form of a computer program, or an electronic board of which the steps of the method of the invention are described in the silicon, or even a programmable electronic chip such as a FPGA (Field-Programmable Gate Array) chip.

Said computer comprises an input interface 503 for receiving well data and the facies distributions, and an output interface 506 for supplying the modified well data and/or the calculated curve. Finally, the computer may comprise, for enabling easy interaction with a user, a screen 501 and a keyboard 502. Of course, the keyboard is optional, in particular in the context of a computer having the form of a touch tablet, for example.

Moreover, the block diagram shown in FIG. 4 is a typical example of a program of which certain instructions may be carried out with the described device. Therefore, FIG. 4 may correspond to the flow chart of the general algorithm of a computer program within the meaning of the invention.

Of course, the present invention is not limited to the embodiments described above by way of examples; it extends to other variants.

Other embodiments are possible.

For example, FIG. 1 shows an orthogonal space $(\vec{z}, \vec{d})$ but a non-orthogonal space is also possible without substantial modification of the implementation.

The invention claimed is:

1. A method for processing well data from a well in a geological subsurface, the well data comprising, for each of a current spot height from a plurality of spot heights, an association between said current spot height and a facies from a plurality of facies, wherein the method comprises;

drilling the well;

receiving the well data from the well;

receiving, for each current facies of the plurality of facies, a presence probability distribution of said current facies, depending on a parameter influencing sedimentation;

for each current spot height of the plurality of spot heights, and in a space comprising at least one first axis and a second axis;

determining at least one point in said space, said at least one point having as a coordinate along the first axis said current spot height and as a coordinate along the second axis a coordinate depending on the presence probability distribution of the facies associated with said current spot height in said received well data;

determining a curve in said space depending on said at least one point for each spot height of the plurality of spot heights; and completing well data or comparing well data with another well data based on said determined curve.

2. The method according to claim 1, wherein the parameter influencing sedimentation is a parameter in a group comprising a distance to the well, a sedimentation energy and a water depth during sedimentation.

3. The method according to claim 1, wherein the at least one determined point is associated with a weight, said weight depending on the presence probability distribution of the facies associated with said current spot height in said received well data, and wherein, the determination of said curve depends on said at least one weight associated with said at least one point.

4. The method according to claim 1, wherein the determination of said curve comprises a polynomial regression or a linear regression or a multiple linear regression or a Savitzky-Golay method.

5. The method according to claim 1, wherein the determination of said curve comprises minimising a distance, said minimised distance comprising an operation in a group comprising;

a sum of distances between the determined curve and the at least one determined point;

a sum of squares of distances between the determined curve and the at least one determined point;

a sum of distances to the power N between the determined curved and the at least one determined point, N being an integer greater than or equal to 3.

6. The method according to claim 3, wherein the determination of said curve comprises minimising a distance, said minimised distance comprising an operation in a group comprising;

a weighted sum of distances between the determined curve and the at least one determined point, the weighting depending on the weights associated with the determined points, a weighted sum of squares of distances between the determined curve and the at least one determined point, the weighting depending on the weights associated with the determined points, a weighted sum of distances to the power N between the determined curve and the at least one determined point, N being an integer greater than or equal to 3, the weighting depending on the weights associated with the determined points.

7. The method according to claim 3, wherein the method further comprises;

for at least one current spot height, normalising a weight of the points having as a coordinate along the first axis said current spot height.

8. The method according to claim 1, wherein the method further comprises;

determining a facies associated with a given spot height, said determination depending on the value of the curve determined for said given spot height, and the received probability distributions.

9. A device for processing well data from a well in a geological subsurface, the well data comprising, for each of a current spot height from a plurality of spot heights, an association between said current spot height and a facies from a plurality of facies, wherein the device comprises;

an interface for receiving well data from the well;

an interface for receiving, for each current facies of the plurality of facies, a presence probability distribution of said current facies, depending on a parameter influencing sedimentation;

for each current spot height of the plurality of spot heights, and in a space comprising at least one first axis and a second axis;

a circuit for determining at least one point in said space, said at least one point having as a coordinate along the first axis said current spot height and as a coordinate along the second axis a coordinate depending on the presence probability distribution of the facies associated with said current spot height in said received well data;

a circuit for determining a curve in said space depending on said at least one point for each spot height of the plurality of spot heights; and a circuit for completing well data or comparing well data with another well data based on said determined curve.

10. A computer program product for use at a computer system, the computer program product for implementing a method for processing well data, the computer program product comprising a computer readable medium having stored thereon computer executable program instructions for implementing the method according to claim 1, when said computer program product is run by a processor.

* * * * *